(12) United States Patent
Mithal

(10) Patent No.: US 7,047,827 B1
(45) Date of Patent: May 23, 2006

(54) FOLDING DIGITAL SCALE

(75) Inventor: Pankaj Mithal, Ann Arbor, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/119,981

(22) Filed: May 2, 2005

(51) Int. Cl.
*G01L 1/02* (2006.01)
*G01L 5/08* (2006.01)
*G01L 7/00* (2006.01)

(52) U.S. Cl. .................................. 73/862.581
(58) Field of Classification Search ............ None
See application file for complete search history.

(56) References Cited

U.S. PATENT DOCUMENTS 4,537,266 A * 8/1985 Greenberg .................. 177/208
4,800,973 A * 1/1989 Angel ........................ 177/211
5,234,065 A * 8/1993 Schmidt ..................... 177/209
6,337,446 B1 * 1/2002 Hulburt et al. ............. 177/126
6,441,323 B1 * 8/2002 Montagnino et al. ....... 177/126

\* cited by examiner

*Primary Examiner*—Max Noori
*Assistant Examiner*—Octavia Davis
(74) *Attorney, Agent, or Firm*—Stefan V. Chmielewski

(57) ABSTRACT

A portable digital scale is foldable for ease of storage and transport. The scale includes a fluid-filled elastomeric bladder and electronic module disposed in a hard-sided case that is opened in use and folded to encase the bladder and electronic module during transport and storage. The electronic module includes a pressure sensor for detecting the fluid pressure in the bladder as a measure of the user's weight, and a user interface and digital display for displaying the weight and/or other parameters requested by the user. Preferably, the electronic module includes a memory device capable of storing multiple weight measurements and a data port for down-loading stored weight data to a personal computer or PDA for tracking weight variation of one or more users over time.

7 Claims, 3 Drawing Sheets

FOLDING DIGITAL SCALE

TECHNICAL FIELD

The present invention relates to a digital scale for measuring a person's weight, and more particularly to a scale designed to be portable.

BACKGROUND OF THE INVENTION

The term digital scale as used herein refers to any electronic weighing device designed to support the weight of a standing person, and to indicate the person's weight on a digital display. A scale is generally considered to be portable if it is relatively small and lightweight, but even scales of this type are not particularly convenient to transport or store due to their size. Accordingly, what is needed is a digital scale that is designed for portability and storage.

SUMMARY OF THE INVENTION

The present invention is directed to an improved digital scale that is foldable to facilitate storage and transport. The scale includes a fluid-filled elastomeric bladder and electronic module disposed in a hard-sided case that is opened in use and folded to encase the bladder and electronic module during transport and storage. The electronic module includes a pressure sensor for detecting the fluid pressure in the bladder as a measure of weight applied to the scale, and a user interface and digital display for displaying the weight and/or other parameters requested by a user. Preferably, the electronic module includes a memory device capable of storing multiple weight measurements and a data port for down-loading stored weight data to a personal computer or PDA for tracking weight variation of one or more users over time.

DESCRIPTION OF THE PREFERRED EMBODIMENT

Figure 1:
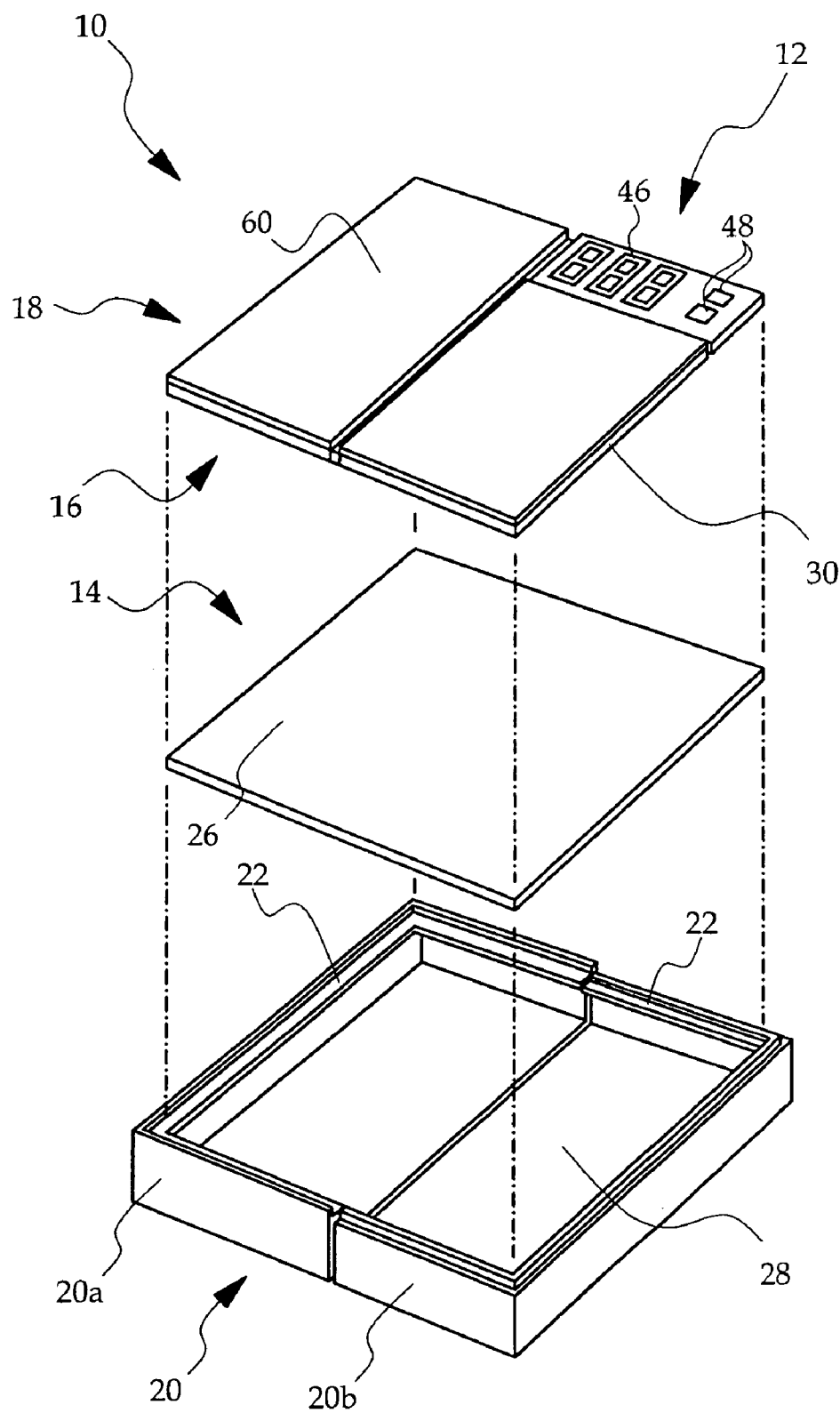
FIG. 1 is a partial exploded view of a folding digital scale according to this invention.
Figure 2:
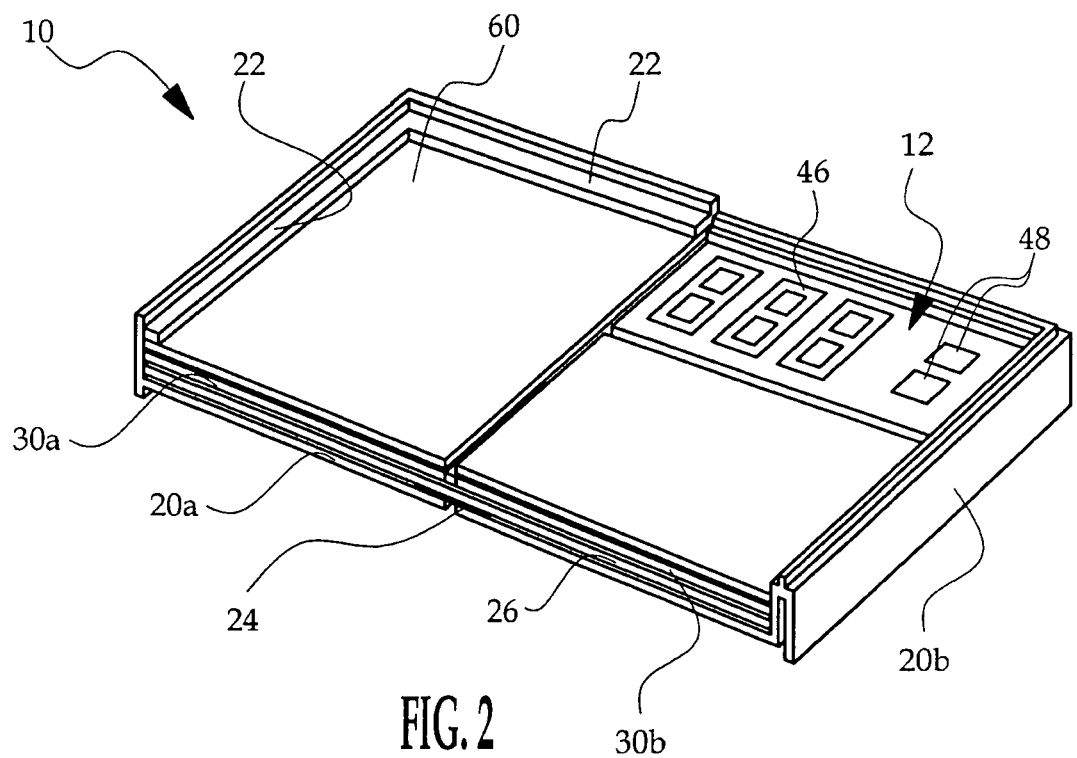
FIG. 2 is a cross-sectional view of the folding digital scale of FIG. 1.
Figure 5:
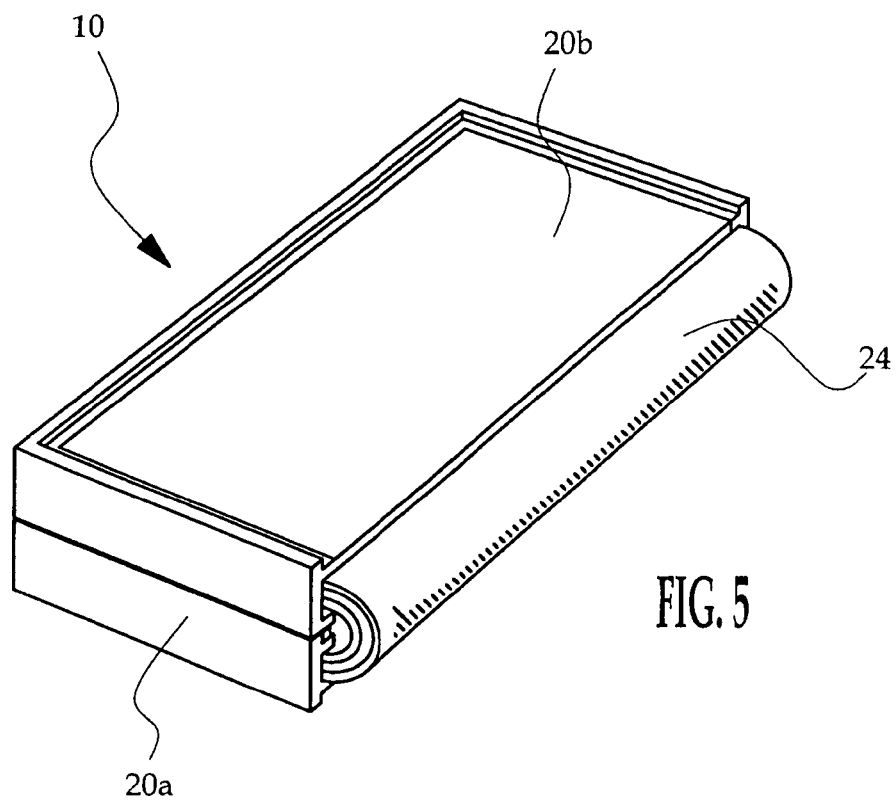
FIG. 5 is a view of the folding digital scale of FIGS. 1–2 in the folded condition.

Referring to FIGS. 1, 2 and 5, the reference numeral 10 generally designates a folding digital scale according to the present invention. The digital scale 10 comprises an electronic module 12 and three foldable layers 14, 16, 18 disposed in a foldable hard-sided case 20. The scale 10 may be open for usage as illustrated in FIGS. 1–2 or folded for storage and/or transport as illustrated in FIG. 5. An inwardly extending flange 22 of case 20 engages the marginal periphery of electronic module 12 and top layer 18 to retain the various components within the case 20.

The case 20 may be formed of ABS or other strong but lightweight plastic, and includes an integral living hinge that allows the case halves 20a, 20b to lie flat against a floor or other flat surface when the case 20 is open as depicted in FIGS. 1–2. In the illustrated embodiment, the living hinge is implemented with a flexible polyurethane sheet 24 that spans the case halves 20a, 20b, and is preferably insert-molded with the case 20.

The first or bottom layer 14 is a felt pad 26 that that rests on the floor 28 of case 20. The felt pad 26 cushions the second or middle layer 16, and protects it from damage due to pinching and the like. Materials other than felt may be used, but felt is preferred due to its low cost and light weight.

Figure 3:
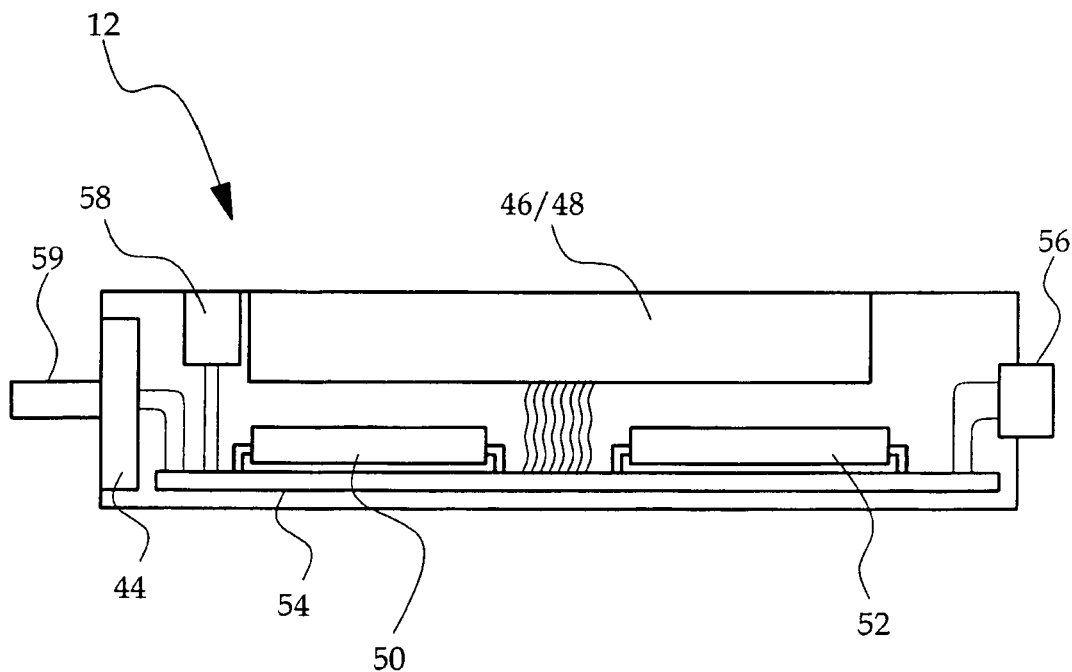
FIG. 3 is a cross-sectional diagram of an electronic module of the folding digital scale of FIGS. 1–2.
Figure 4:
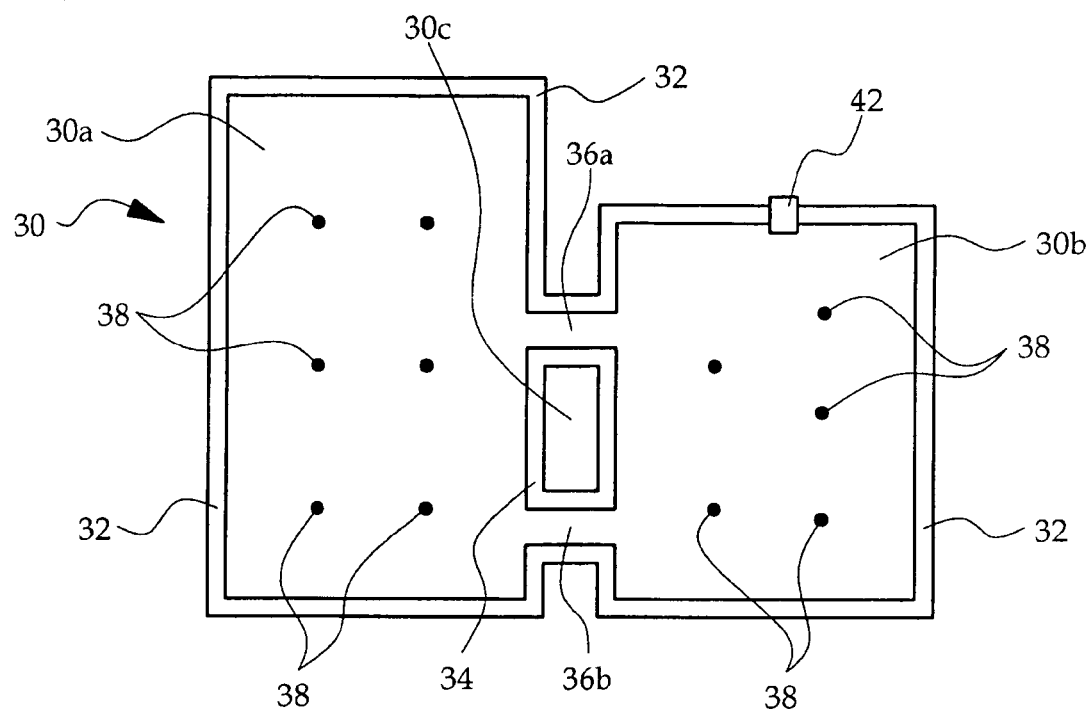
FIG. 4 is a view of the fluid-filled bladder of the folding digital scale of FIGS. 1–2.

Referring to FIG. 4, the second or middle layer 16 is a fluid-filled elastomeric bladder 30 formed by joining upper and lower sheets of elastomeric material to form a closed volume, and then filling the closed volume with a suitable liquid such as silicone oil. The upper and lower elastomeric sheets are joined by an outer peripheral weld 32, and an inner weld 34 divides the bladder 30 into left and right sides 30a, 30b. A pair of channels 36a, 36b defined by the outer and inner welds 32, 34 enable fluid communication between the left and right bladder sides 30a, 30b. The bladder material 30c within the inner weld 34 may be removed if desired. Also, the upper and lower sheets of bladder 30 within the left and right sides 30a, 30b may be joined by a pattern of spot welds 38 to prevent pooling of the bladder fluid. The right side 30b of bladder 30 is undercut as shown to accommodate the electronic module 12, and a fluid port 42 in the periphery of bladder 30 adjacent the location of electronic module 12 enables measurement of the fluid pressure within bladder 30 by a pressure sensor 44 of electronic module 12 as described below in reference to FIG. 3.

Referring to FIGS. 1–3, the electronic module 12 houses a digital (LCD or LED) display 46, a pair of user interface switch inputs 48, a pressure sensor 44, a set of control and memory integrated circuit (IC) chips 50, 52 mounted on a circuit board 54, a serial data port 56 and a battery compartment 58. The pressure sensor 44 is coupled to the fluid port 42 of bladder 30 by a pressure tube 59, and a sensor output signal responsive to the fluid pressure in bladder 30 is coupled to control IC 50 via conductor traces on circuit board 54. The control IC 50 determines a weight corresponding to the sensed fluid pressure (and possibly other factors such as temperature, etc.) and displays the weight on digital display 46. The user switch inputs 48 can be used to select the displayed weight measurement units (i.e., metric or English) and to associate the weight with a user profile stored in memory IC 52. When the user is not standing on the scale 10, the user switch inputs 48 can be manipulated to display a stored weight history for a selected user, and the stored weight data can be downloaded from memory IC 52 to a personal computer or PDA via serial data port 56.

The third or top layer 18 is a foldable polypropylene pad 60 that covers the bladder 30. The pad 60 serves as an interface between the user (and footwear, if any) and the bladder 30; it protects the bladder 30 from damage and helps distribute the user's weight. Foldability of the pad 60 can be facilitated by a living hinge of flexible material such as polyurethane bonded to the inboard face of pad 60 as shown.

In summary, the present invention provides a portable digital scale that is foldable for ease of stowing and transport. Foldability is enabled by using a fluid filled elastomeric bladder to measure weight, and the foldable outer case protects the bladder when the scale is not in use. While the present invention has been described with respect to the illustrated embodiment, it is recognized that numerous modifications and variations in addition to those mentioned herein will occur to those skilled in the art. Accordingly, it is intended that the invention not be limited to the disclosed embodiment, but that it have the full scope permitted by the language of the following claims.

The invention claimed is:

1. A portable digital scale comprising:
    first and second hard-sided case halves joined by a flexible living hinge that enables said case halves to be selectively folded together for storage and transport of the scale;
    a single foldable fluid-filled elastomeric bladder having first and second portions respectively disposed in the first and second case halves, and a foldable portion intermediate the first and second portions defining at least one fluid channel coupling the first and second portions;
    a digital display;
    a pressure sensor coupled to said bladder for measuring a fluid pressure therein; and
    circuitry for activating said digital display to indicate a weight applied to said bladder based on the fluid pressure measured by said pressure sensor.

2. The portable digital scale of claim 1, further comprising:
    an electronic module disposed in said second case half, said electronic module housing said digital display, said pressure sensor and said circuitry.

3. The portable digital scale of claim 1, wherein said foldable portion of said bladder is defined by a weld that joins upper and lower layers of said bladder intermediate said first and second portions.

4. The portable digital scale of claim 2, wherein said second case half includes an inwardly depending flange that engages a margin of said electronic module to retain said electronic module in said second case half.

5. The portable digital scale of claim 2, wherein said circuitry includes a memory device for storing weight data, and said electronic module includes a data port for downloading the stored weight data to an external device.

6. The portable digital scale of claim 1, wherein:
    a foldable pad covers an outboard face of said bladder; and
    said first and second case halves include inwardly depending flanges that engage a margin of said foldable pad to retain said pad and said bladder within said first and second case halves.

7. The portable digital scale of claim 1, wherein said flexible living hinge is insert molded with said first and second case halves.

* * * * *